US011493941B2

(12) United States Patent
Quevallier

(10) Patent No.: US 11,493,941 B2
(45) Date of Patent: Nov. 8, 2022

(54) THERMOSTATIC VALVE

(71) Applicant: NOVARES FRANCE, Clamart (FR)

(72) Inventor: Jean-Claude Quevallier, Lesquin (FR)

(73) Assignee: NOVARES FRANCE, Clamart (FR)

( * ) Notice: Subject to any disclaimer, the term of this patent is extended or adjusted under 35 U.S.C. 154(b) by 68 days.

(21) Appl. No.: 16/772,099

(22) PCT Filed: Dec. 12, 2018

(86) PCT No.: PCT/FR2018/053240
§ 371 (c)(1),
(2) Date: Jun. 11, 2020

(87) PCT Pub. No.: WO2019/115946
PCT Pub. Date: Jun. 20, 2019

(65) Prior Publication Data
US 2020/0333811 A1  Oct. 22, 2020

(30) Foreign Application Priority Data
Dec. 13, 2017  (FR) ...................................... 17/62069

(51) Int. Cl.
*F01P 7/02* (2006.01)
*G05D 23/02* (2006.01)
(Continued)

(52) U.S. Cl.
CPC ............ *G05D 23/022* (2013.01); *F01P 7/167* (2013.01); *F16K 11/02* (2013.01); *F16K 31/002* (2013.01); *F01P 2007/146* (2013.01)

(58) Field of Classification Search
CPC .......... F16K 31/002; F16K 3/24; F16K 11/02; F01P 7/16; F01P 7/167; F01P 7/14
(Continued)

(56) References Cited

U.S. PATENT DOCUMENTS 3,556,463 A * 1/1971 Williams .............. F16K 31/363
251/14
6,772,958 B1 * 8/2004 Lamb ........................ F01P 7/16
236/100
(Continued)

FOREIGN PATENT DOCUMENTS

CN  102425687 B   7/2013
EP     2132468 B1   2/2013
WO  2017155483 A1  9/2017

OTHER PUBLICATIONS

English Translation to Abstract CN 102425687.
English Translation to International Search Report for Application No. PCT/FR2018/053240.
(Continued)

*Primary Examiner* — Long T Tran
*Assistant Examiner* — James J Kim
(74) *Attorney, Agent, or Firm* — Cantor Colburn LLP

(57) ABSTRACT

The invention concerns a thermostatic valve (1) comprising a closed hollow body (2), a first opening leading into the hollow body (2), referred to as the inlet opening (4), a second opening leading into the hollow body (2), referred to as the main outlet (5), a third opening, substantially perpendicular to the second opening, leading into the hollow body (2), referred to as the bypass outlet (7), and a seal (11) allowing the inlet opening (4) to be alternately separated from the main outlet (5) or the bypass outlet (7). The seal (11) comprises a thermostatic actuator (12) and a skirt (13) which is made of plastic material and has at least one window (19) suitable for being traversed by a fluid, the skirt (13) being capable of sliding in the hollow body (2), along an axis that substantially coincides with the axis of the thermostatic actuator (12), between a first position in which the skirt (13) seals the main outlet (5), such that the fluid flows between the inlet opening (4) and the bypass outlet (7), and a second position in which the skirt (13) leaves the main outlet (5) open and seals the bypass outlet (7), such that the (Continued)

fluid from the inlet opening (4) can pass through the window (19) and flow through the main outlet (5).

20 Claims, 6 Drawing Sheets

(51) Int. Cl.
*F01P 7/16* (2006.01)
*F16K 11/02* (2006.01)
*F16K 31/00* (2006.01)
*F01P 7/14* (2006.01)

(58) Field of Classification Search
USPC .................................................... 123/41.05
See application file for complete search history.

(56) References Cited

U.S. PATENT DOCUMENTS

| | | | |
|---|---|---|---|
| 8,690,072 B2* | 4/2014 | Peric ..................... | F01P 7/14 |
| | | | 236/93 R |
| 2001/0013553 A1* | 8/2001 | Chamot ................. | F16K 31/04 |
| | | | 236/12.1 |
| 2003/0150923 A1* | 8/2003 | Leu ....................... | F01P 7/167 |
| | | | 236/34.5 |
| 2015/0315941 A1* | 11/2015 | Kim ....................... | F16K 21/04 |
| | | | 236/34.5 |

OTHER PUBLICATIONS

International Search Report for Application No. PCT/FR2018/053240.
Written Opinion for Application No. PCT/FR2018/053240.

* cited by examiner

THERMOSTATIC VALVE

CROSS REFERENCE TO RELATED APPLICATIONS

This application is a National Stage of PCT Application No. PCT/FR2018/053240 filed on Dec. 12, 2018, which claims priority to French patent application FR 17/62069 filed on Dec. 13, 2017 the contents each of which are incorporated herein by reference thereto.

TECHNICAL FIELD

The present invention concerns the field of thermostatic valves. A thermostatic valve is typically used in the field of automatic thermal regulation for fluid circuits (gas, water, oil . . . ).

BACKGROUND

In a known manner, as represented in FIGS. 1 and 2, a thermostatic valve comprises a closed hollow body 100 pierced by an inlet opening 101, a main outlet 102, a bypass outlet 103 and comprising a shutter 104 separating the inlet opening 101 alternately from the main outlet 102 or from the bypass outlet 103, in a tight manner. The shutter is sensitive to the temperature of the fluid so as to open above a threshold temperature and to close below said threshold temperature.

An illustrative application in the automotive field is the making of (convergent) water inlet housings or (divergent) water outlet housings.

The shutter of a thermostatic valve typically comprises a thermostatic actuator, such as a wax cartridge, and a flap actuated by the thermostatic actuator. The wax cartridge comprises a cylinder filled with a temperature-sensitive wax. The wax pushes a rod by the effect of a considerable volume change accompanying a solid/liquid phase change, occurring at a threshold temperature or opening start temperature.

In general, as represented in FIGS. 1 and 2, the main outlet 102 and the bypass outlet 103 are aligned. The shutter 104 slides axially so as to alternately seal either one of the outlets. According to this arrangement, the shutter always bears against the mouth of one of the outlets to be sealed. Such an arrangement is advantageous in that it is easy to achieve tightness of such a shutter. However, a considerable heat may increase the expansion of the wax cartridge beyond the stroke that is possible for the flap. In this case, the flap could be forced against the walls of the hollow body, and be damaged. In order to avoid this phenomenon, a known solution consists in embedding an elastic device allowing absorbing the over-stroke of the wax cartridge. However, this results in an additional cost due to the manufacture of the different elements (flaps, guide rod and over-stroke spring) and an additional bulk.

Furthermore, conventionally, the flap is disposed perpendicular to the axis of the thermostatic actuator. Such an arrangement is advantageous in that it is easy to achieve tightness of such a flap for a reasonable cost. However, a drawback consists in that, in case of presence of a difference between the pressures applied on either sides of the flap, the thermostatic actuator must generate an additional force, during the opening of the plug, in order to overcome this pressure difference. This necessary additional force introduces a delay on opening equivalent to an increase in the threshold temperature. Also, the thermostatic valve has a sensitivity to the differential pressure modifying its threshold temperature.

BRIEF DESCRIPTION

In order to overcome these problems, a known solution from the document WO 2017/155483 consists in using a hollow body in which the main outlet and the bypass outlet are radial. In addition, this device uses the differential pressure to tighten the sealing of an outlet by the plug. However, the plug comprises several parts, which makes the manufacture thereof complex and expensive.

Hence, there is a need to provide a thermostatic valve that is insensitive to the over-strokes of the wax cartridge and at low cost.

According to a general definition, the invention concerns a thermostatic valve comprising a closed hollow body, a first opening leading into the hollow body, referred to as the inlet opening, a second opening leading into the hollow body, referred to as the main outlet, a third opening, substantially perpendicular to the second opening, leading into the hollow body, referred to as the bypass outlet, and a shutter allowing separating the inlet opening alternately from the main outlet or from the bypass outlet. The shutter comprises a thermostatic actuator and a skirt that is made of a plastic material and has at least one aperture adapted to be traversed by a fluid. The skirt is adapted to slide within the hollow body, along an axis that substantially coincides with the axis of the thermostatic actuator, between a first position in which the skirt seals the main outlet, such that the fluid circulates between the inlet opening and the bypass outlet, a second position in which the skirt leaves the main outlet open and seals the bypass outlet, such that the fluid from the inlet opening can pass through the aperture and flow through the main outlet, and a third over-stroke position in which a portion of the skirt is positioned in an over-stroke area of the hollow body and in which the skirt leaves the main outlet open and seals the bypass outlet.

In a particularly advantageous manner, the skirt allows sealing outlets that are perpendicular to one another. This arrangement allows overcoming the problems of over-strokes of the wax cartridge. Indeed, in case of over-stroke of the wax cartridge, the skirt may be displaced within the hollow body, in the over-stroke area while maintaining the tightness of the sealing of the bypass outlet and without being compressed against the mouth of a fluid outlet.

The alternating sealing of two radial outlets is enabled by the aperture. Indeed, when the skirt is in the first position, the skirt is moved away from the bypass outlet and seals the main outlet. When the skirt is in the second position, the skirt seals the bypass outlet, but the aperture enables the fluid to flow between the inlet opening and the main outlet.

Furthermore, the relative flexibility of the skirt made of a plastic material advantageously allows using the pressure differences inside the hollow body to achieve tightness of the sealing in the first and second positions.

The thermostatic valve according to the invention has a simple structure, comprising a reduced number of elements, made at low cost, in comparison with the existing thermostatic valves which use expensive elastic devices.

Thus, the invention proposes a thermostatic valve that is insensitive to the over-strokes of the wax cartridge and at low cost.

The skirt comprises a substantially circular bottom wall and a cylindrical lateral wall in which said at least one aperture is formed. The bottom wall is adapted to seal the main outlet and the lateral wall being adapted to seal the bypass outlet.

The hollow body comprises at least one shoulder positioned at the mouth of the bypass outlet, so as to ensure static tightness with the lateral wall of the skirt when the skirt is in the second position.

The mouth of the main outlet has a conical wall.

The bottom wall of the skirt has a chamfer adapted to bear against the conical wall.

The lateral wall of the skirt has two apertures.

According to one embodiment, the two apertures may be diametrically opposite to one another.

A portion of the thermostatic actuator crosses the bottom wall of the skirt.

According to a particular arrangement, the hollow body may comprise a fourth opening, referred to as the warm-up outlet, adapted to be sealed by the skirt in the second position.

The warm-up outlet and the bypass outlet may be positioned in the hollow body at distinct axial locations.

According to one embodiment, the hollow body may comprise a fifth opening, referred to as the air-heater outlet, the air-heater outlet being adapted to be sealed by the skirt in the second position.

The air-heater outlet may be positioned according to an axis distinct from the longitudinal axis of the bypass outlet, such that the skirt separately seals or leaves open the air-heater outlet and the bypass outlet.

The air-heater outlet and the bypass outlet may be positioned in the hollow body at distinct axial locations.

BRIEF DESCRIPTION OF THE DRAWINGS

Other features and advantages of the present invention will clearly come out from the detailed description hereinafter of two embodiments of the invention provided as non-limiting examples, with reference to the appended drawings, in which.

DETAILED DESCRIPTION

Figure 1:
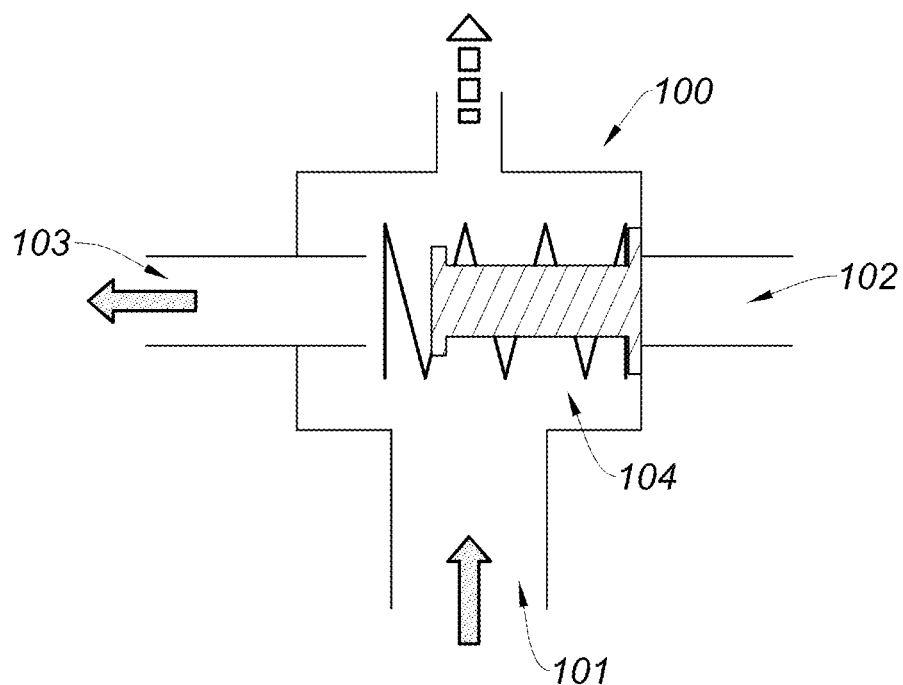
FIG. 1 is a schematic representation of a thermostatic valve of the prior art in which the plug is in the sealing position of the main outlet.
Figure 2:
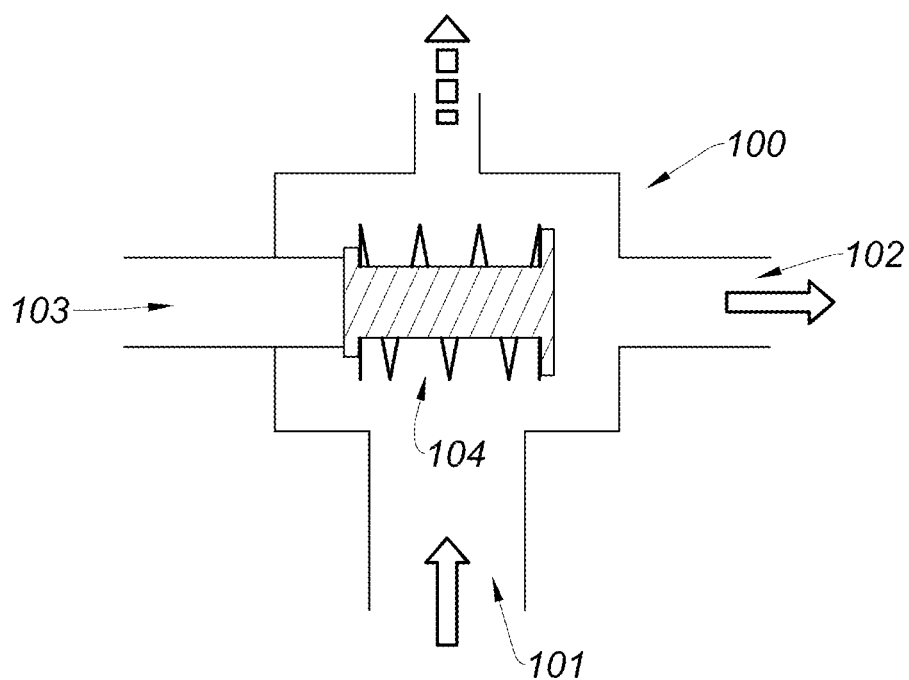
FIG. 2 is a schematic representation of a thermostatic valve of the prior art in which the plug is in the sealing position of the bypass outlet.
Figure 3:
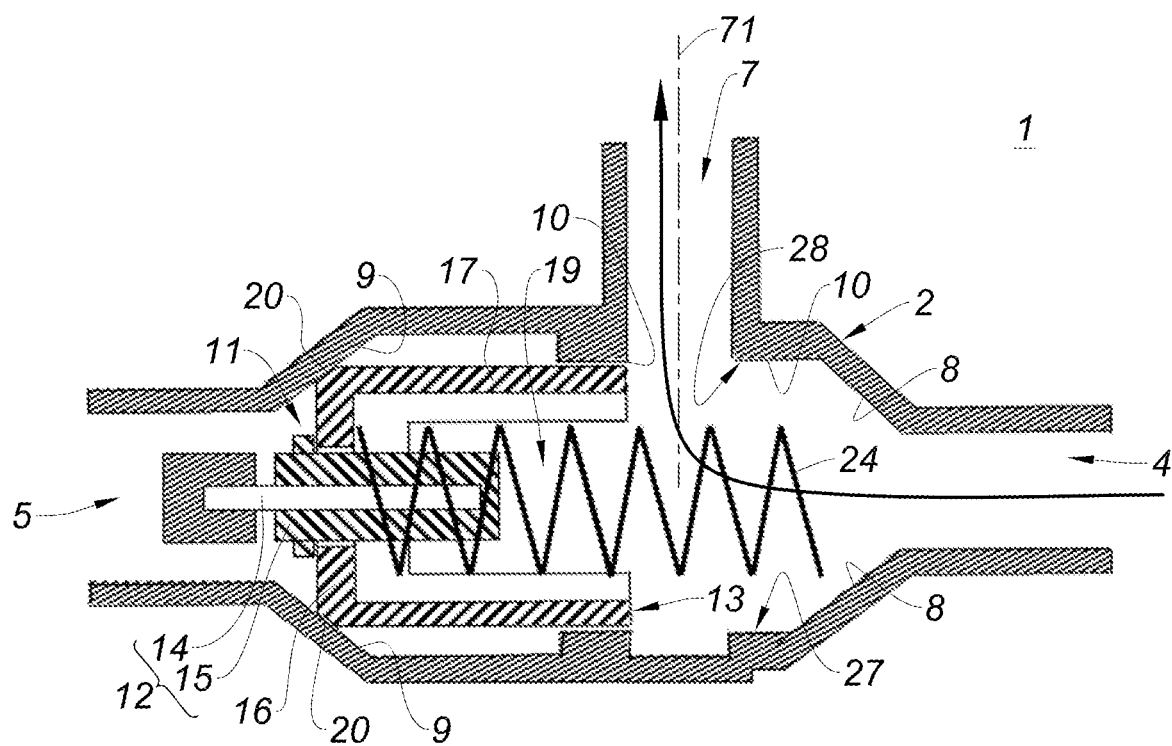
FIG. 3 is a sectional front schematic view of a thermostatic valve according to a first embodiment of the invention, when the skirt is in the first position.
Figure 4:
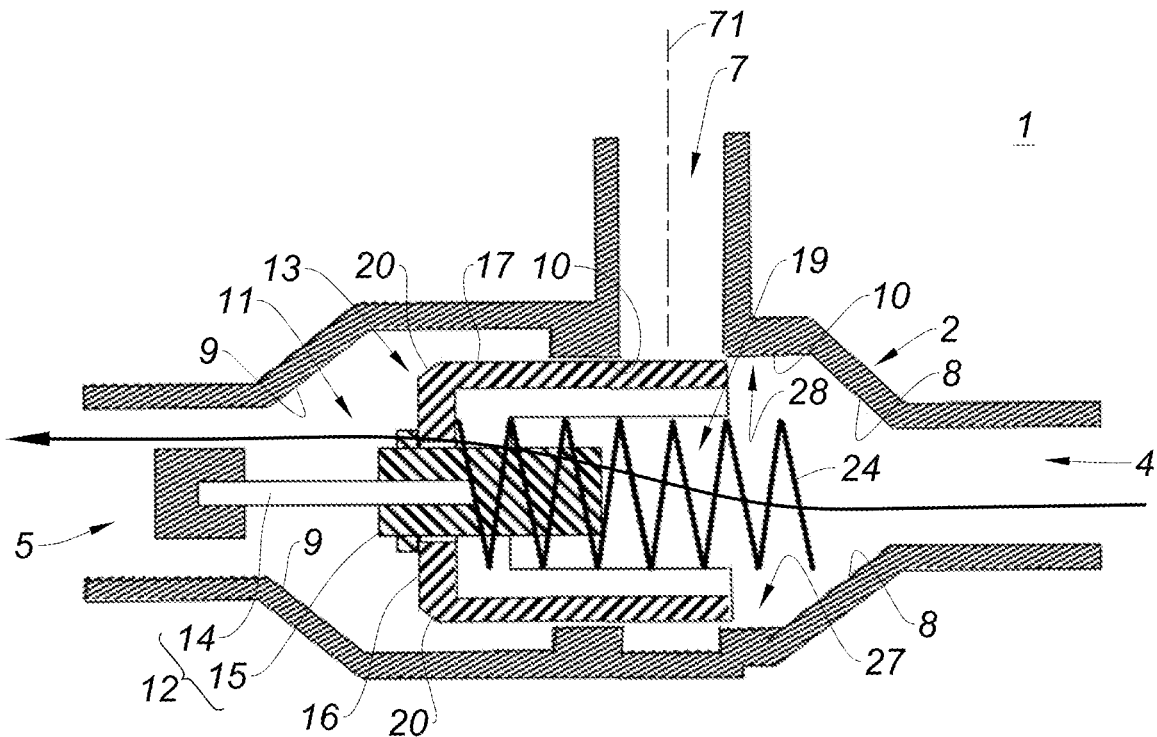
FIG. 4 is a sectional front schematic view of a thermostatic valve according to a first embodiment of the invention, when the skirt is in the second position.

For simplicity, elements that are identical in the different embodiments of the invention bear identical reference numerals.

The invention concerns a thermostatic valve 1 which comprises a closed hollow body 2.

As illustrated in FIGS. 3 to 6, according to a first embodiment, the hollow body 2 has three through openings: a first opening referred to as the inlet opening 4, a second opening referred to as the main outlet 5 connected in general to a radiator and a third opening referred to as the bypass outlet 7 connected in general to a return circuit towards the engine.

As can be observed, the inlet opening 4 and the main outlet 5 are opposite one another, substantially coaxial. The bypass outlet 7 is positioned between the inlet opening 4 and the main outlet 5, perpendicular to these two openings. As will be explained later on, the radial positioning of the bypass outlet 7 is a particularly advantageous arrangement of the invention.

The mouth of the inlet opening 4 may have a conical wall 8. Similarly, the mouth of the main outlet 5 has a conical wall 9. The hollow body 2 comprises two annular ribs 10 positioned at the mouth of the bypass outlet 7. The function of the annular ribs 10 will be presented later on.

Figure 7:
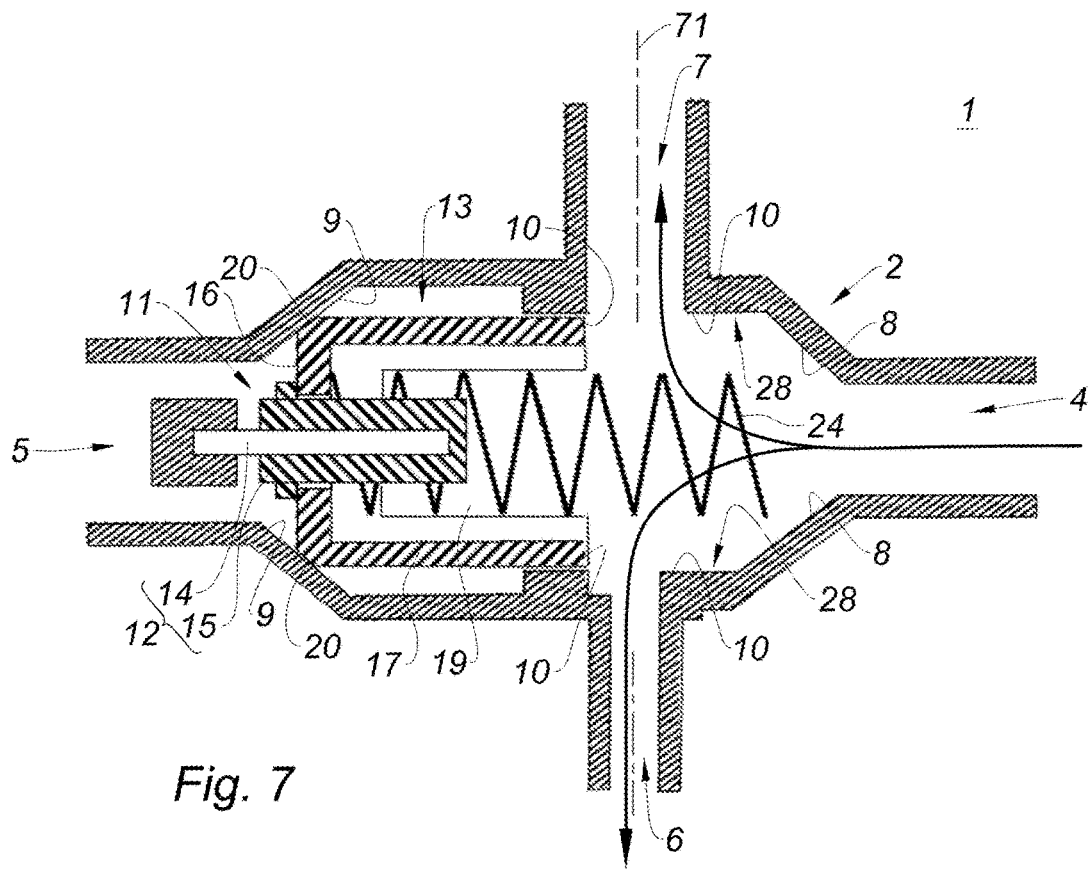
FIG. 7 is a sectional front schematic view of a thermostatic valve according to a second embodiment of the invention, when the skirt is in the first position.
Figure 8:
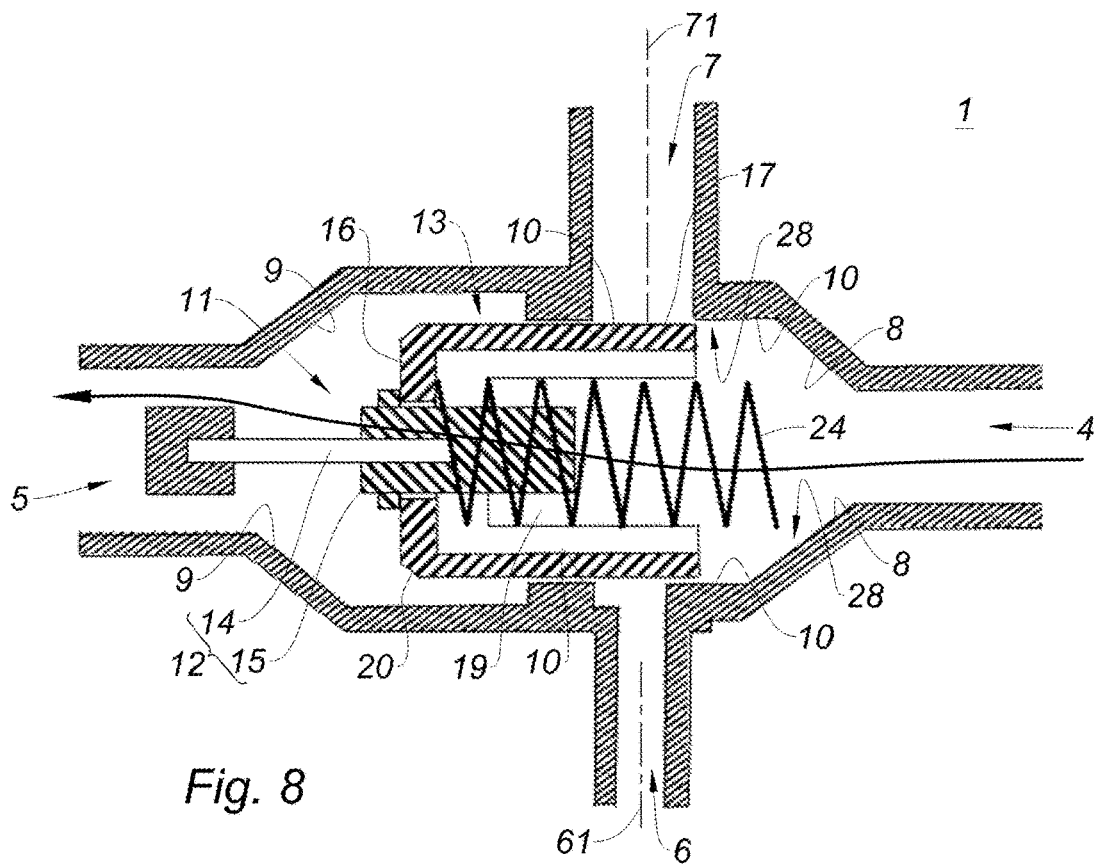
FIG. 8 is a sectional front schematic view of a thermostatic valve according to a second embodiment of the invention, when the skirt is in the second position.

According to a second embodiment, shown in FIGS. 7 and 8, the hollow body 2 has a fourth opening referred to as the warm-up outlet 6. The warm-up outlet 6 and the bypass outlet 7 are positioned in the hollow body 2 at distinct axial locations. The offset between the warm-up outlet 6 and the bypass outlet 7 may be made by offsetting the respective longitudinal axes 61 and 71 of the warm-up outlet 6 and of the bypass outlet 7. The offset may also be obtained by using outlets with different diameters.

Figure 9:
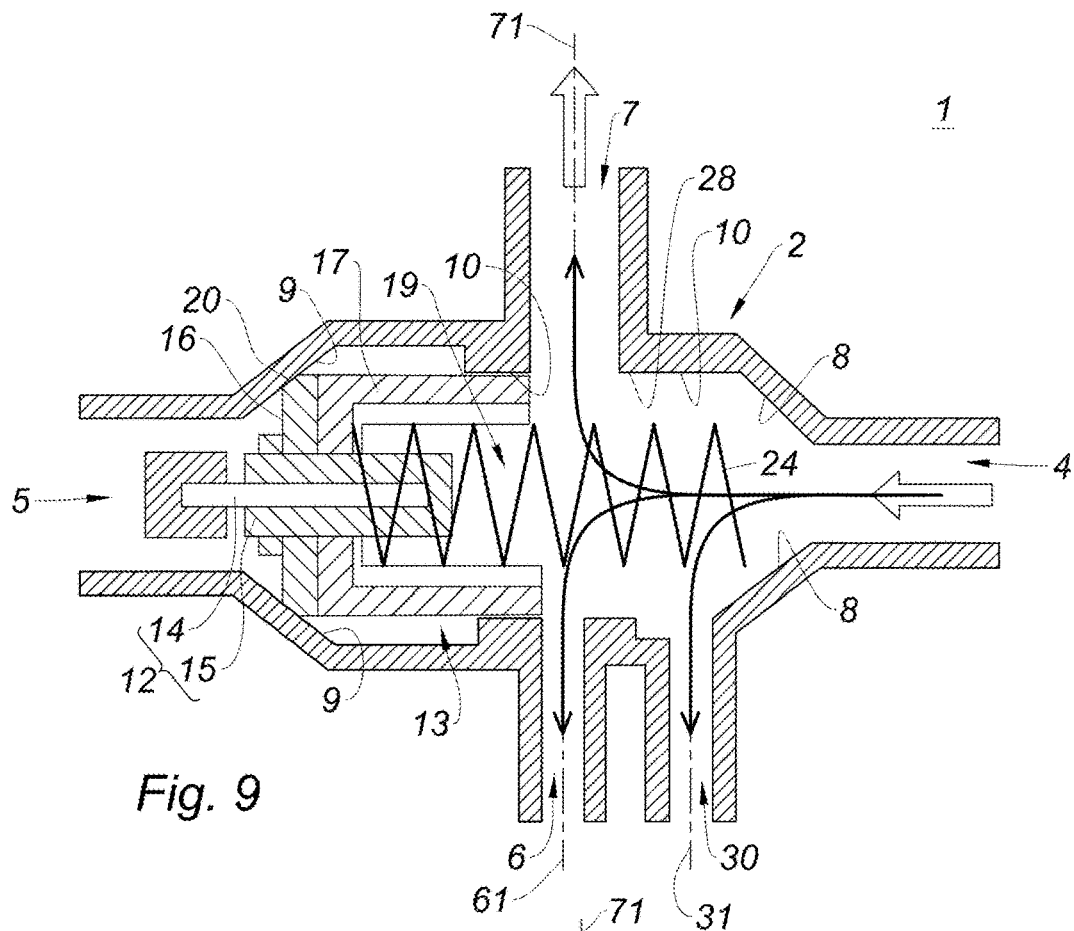
FIG. 9 is a sectional front schematic view of a thermostatic valve according to a third embodiment of the invention, when the skirt is in the first position.
Figure 10:
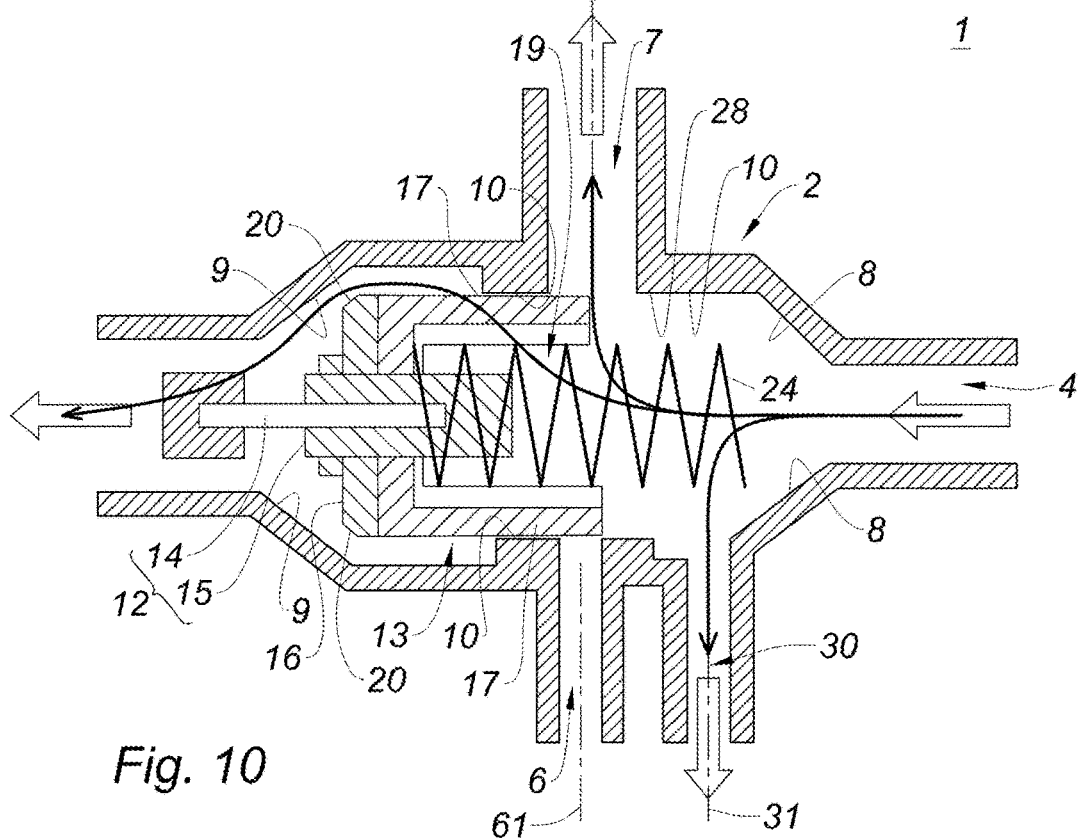
FIG. 10 is a sectional front schematic view of a thermostatic valve according to a third embodiment of the invention, when the skirt is in the sealing position of the warm-up outlet.
Figure 11:
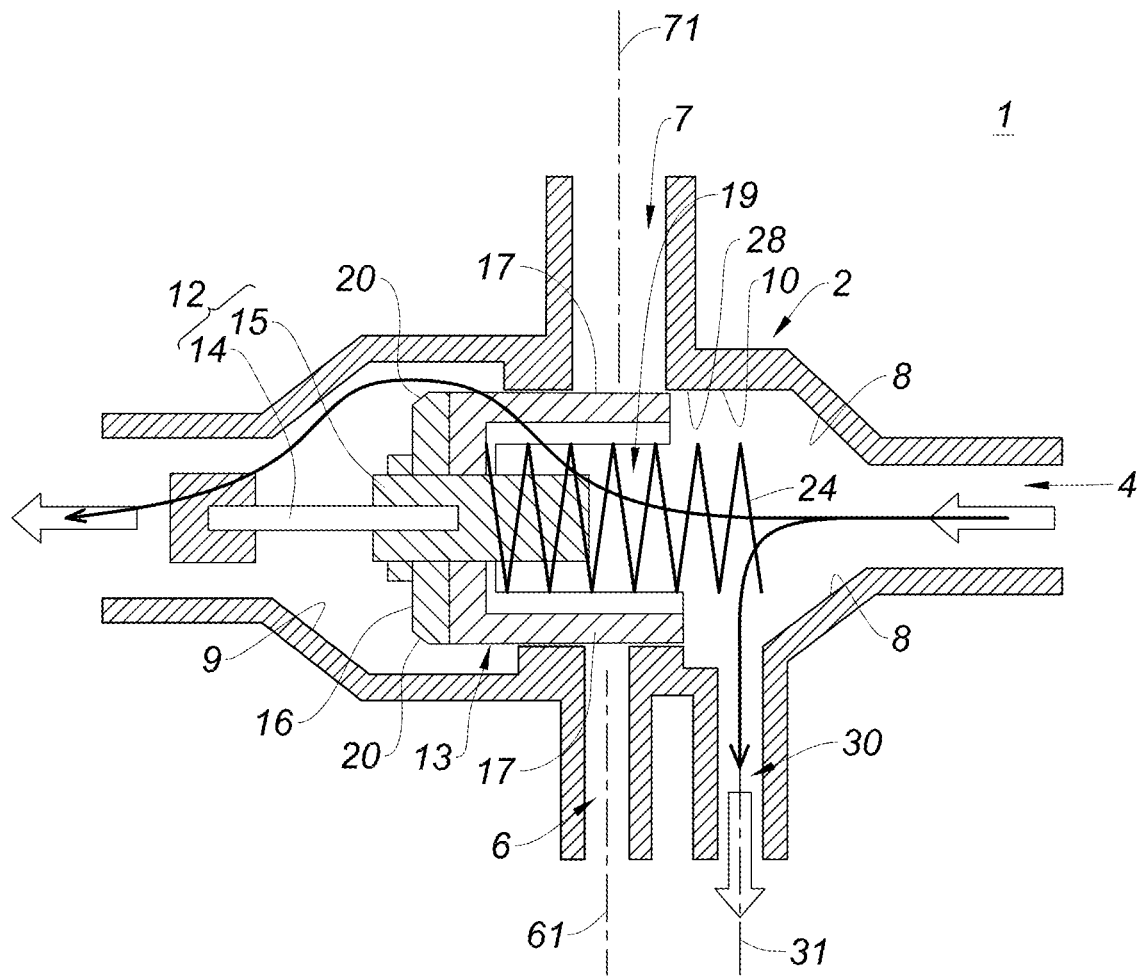
FIG. 11 is a sectional front schematic view of a thermostatic valve according to a third embodiment of the invention, when the skirt is in the sealing position of the bypass outlet and of the warm-up outlet.

According to a third embodiment, shown in FIGS. 9 to 11, the hollow body 2 has a fifth opening referred to as the air-heater outlet 30. The air-heater outlet 30 and the bypass outlet 7 are positioned in the hollow body 2 at distinct axial locations. The offset between the air-heater outlet 30 and the bypass outlet 7 may be made by offsetting the respective longitudinal axes 31 and 71 of the air-heater outlet 30 and of the bypass outlet 7. The offset may also be obtained by using outlets with different diameters.

Furthermore, the thermostatic valve 1 comprises a shutter 11. The shutter 11 comprises a thermostatic actuator 12 and a skirt 13 made of a plastic material.

Conventionally, the thermostatic actuator 12 comprises a rod 14 fastened by a first end to the hollow body 2, at the mouth of the main outlet 5. A wax cartridge 15 is positioned at the second end of the rod 14.

The skirt 13 comprises a substantially circular bottom wall 16 and a cylindrical lateral wall 17. According to the embodiments presented herein, with reference to FIG. 5, the lateral wall 17 has two apertures 19. According to other embodiments, the lateral wall 17 may have a different number of apertures 19.

Figure 5:
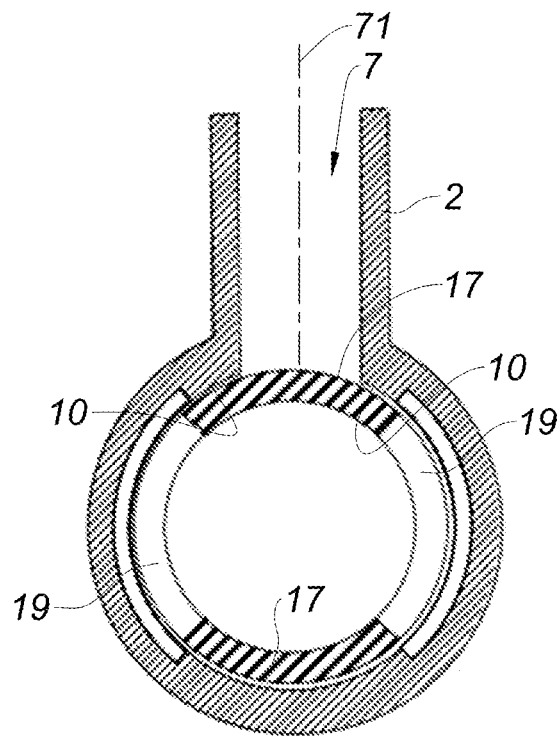
FIG. 5 is a sectional side schematic view of a skirt in a hollow body according to the invention.

As can be observed in FIG. 5, the two apertures 19 are diametrically opposite to one another. As will be explained later on, this technical arrangement enables the skirt 13 to seal the bypass outlet 7 while enabling a fluid to cross the apertures 19 so as to flow in the main outlet 5.

The bottom wall 16 has a chamfer 20 adapted to bear against the conical wall 9 of the mouth of the main outlet 5.

The bottom wall 16 is crossed by the wax cartridge 15. The wax cartridge 15 is fastened to the bottom wall 16 such that an expansion of the wax cartridge 15 causes a translation of the skirt 13.

As will be described hereinafter, the skirt 13 is movable in translation within the hollow body 2, between several positions.

The shutter 11 also comprises a biasing spring 24, bearing against the bottom wall 16 and against the mouth of the inlet opening 4.

In the use condition, in a vehicle, the thermostatic valve 1 may be connected to the cooling circuit of the engine of the vehicle. The thermostatic valve 1 then allows directing the coolant liquid, in general glycol-water, depending on its temperature and therefore on the operating temperature of the engine.

In the initial state, at the engine start-up, the coolant liquid is cold, at ambient temperature. The fluid flows through the inlet opening 4 and comes into contact with the wax cartridge 15. The temperature of the fluid causes the expansion or the retraction of the wax cartridge 15. As long as the temperature of the fluid does not reach the expansion temperature of the wax, the wax cartridge 15 remains contracted. When the wax cartridge 15 is contracted, the skirt is maintained in a first position, in which, the biasing spring 24 pushes the skirt 15 against the mouth of the main outlet 5. Thus, in the first position, the bottom wall 16 of the skirt 13 seals the main outlet 5. In this first position, the skirt 13 is moved away from the bypass outlet 7 (and/or from the warm-up outlet 6 in the case of the second embodiment, and/or from the air-heater outlet 30 in the case of the third embodiment). When the skirt 13 is in the first position, the fluid flows from the inlet opening 4 towards the bypass outlet 7 (and/or from the warm-up outlet 6 in the case of the second embodiment and/or from the air-heater outlet 30 in the case of the third embodiment).

When the temperature of the fluid reaches the expansion temperature of the wax, the wax cartridge 15 expands and pushes on the skirt 13 opposite to the action of the biasing spring 24. The skirt 13 then switches into the second position. In the second position, the bottom wall 16 is moved away from the main outlet 5. On the contrary, the lateral wall 17 seals the bypass outlet 7 (and the warm-up outlet 6 in the case of the second embodiment). In a particularly advantageous manner, the differential pressure between the different elements of the hollow body 2 deforms the constitutive material of the skirt 13 and thus, presses the lateral wall 17 against the annular ribs 10. The pressure of the lateral wall 17 against the annular ribs 10 increases the static tightness of the sealing of the bypass outlet 7 (and/or of the warm-up outlet 6 in the case of the second embodiment, and/or of the air-heater outlet 30 in the case of the third embodiment). It should be noted that, in the case of the second and third embodiments, the offset of the warm-up outlet 6 and of the air-heater outlet 30 with respect to the bypass outlet 7 enables the lateral wall 17 to separately seal these different outlets.

Thus, in the case of the second embodiment, depending on the expansion of the wax cartridge 15, the lateral wall 17 may seal only the warm-up outlet 6, or seal the warm-up outlet 6 and the bypass outlet 7.

In the case of the third embodiment, depending on the expansion of the wax cartridge 15, the lateral wall 17 may seal only the warm-up outlet 6, as represented in FIG. 10, or the warm-up outlet 6 and the bypass outlet 7 as represented in FIG. 11, or the warm-up outlet 6, the bypass outlet 7 and the air-heater outlet 30.

Advantageously, the apertures 19 enable the fluid to cross the skirt 13 so as to flow in the main outlet 5.

Figure 6:
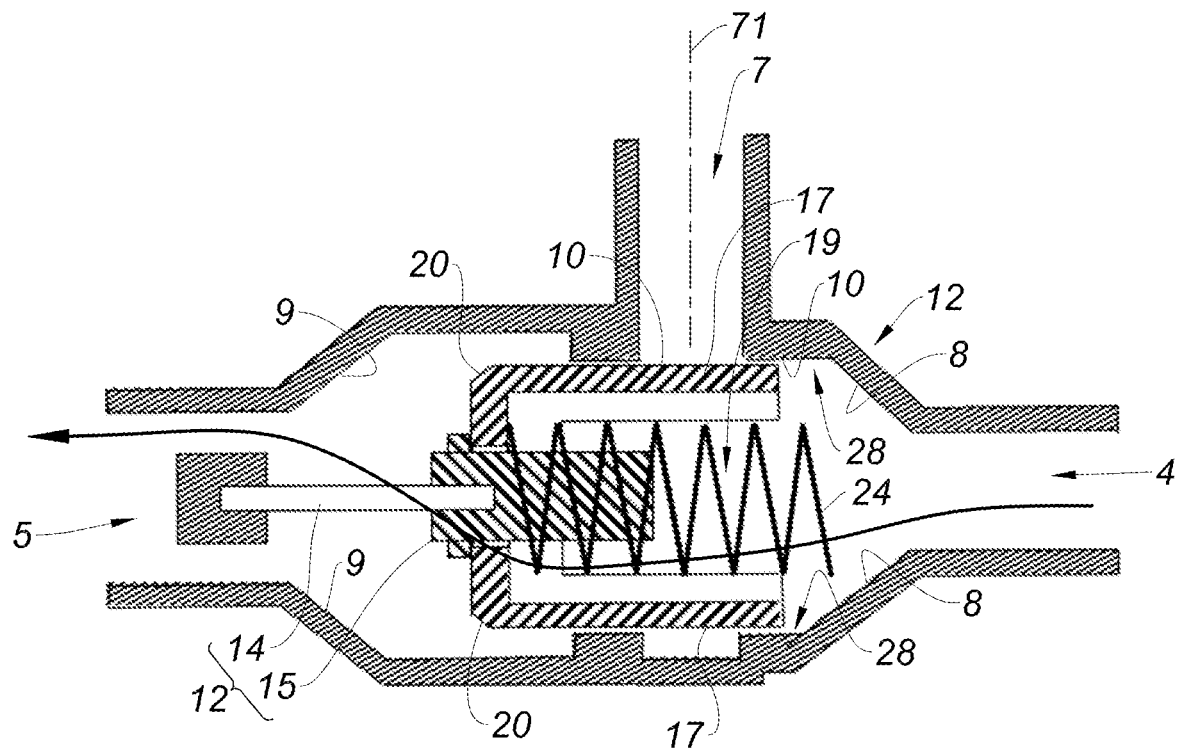
FIG. 6 is a sectional front schematic view of a thermostatic valve according to a first embodiment of the invention, when the skirt is in the over-stroke position.

In the case of a considerable rise in the temperature of the fluid, the expansion of the wax cartridge 15 may cause an over-stroke of the skirt 13, which then switches into the over-stroke position. As represented in FIG. 6, in the over-stroke position, the skirt 13 can translate within the hollow body 2, in an over-stroke area 28. The over-stroke area 28 is constituted by the annular ribs 10. Thus, in the over-stroke position, the skirt 13 can translate without colliding with the hollow body 2 while maintaining tightness of the sealing of the bypass outlet 7 (and of the warm-up outlet 6 in the case of the second embodiment).

When the temperature of the fluid falls below the expansion temperature of the wax, the biasing spring 24 repositions the skirt 13 into the first position.

Thus, the thermostatic valve 1 according to the invention has a simple structure, comprising a reduced number of elements, which may be made at low cost, in comparison with the existing thermostatic valves which use expensive elastic devices.

Hence, the invention provides a thermostatic valve that is insensitive to over-strokes of the wax cartridge, enabling the sequenced closure of several outlets, and at low cost.

Of course, the invention is not limited to the sole embodiments represented hereinabove, but it encompasses on the contrary all variants thereof.

The invention claimed is:

1. A thermostatic valve comprising:
   a closed hollow body,
   an inlet opening leading into the hollow body,
   a main outlet leading into the hollow body,
   a bypass outlet, substantially perpendicular to the main outlet, leading into the hollow body, and
   a shutter allowing separating the inlet opening alternately from the main outlet or from the bypass outlet, wherein, the shutter comprises a thermostatic actuator and a skirt that is made of a plastic material and has at least one aperture adapted to be traversed by a fluid, the skirt being adapted to slide within the hollow body, along an axis that substantially coincides with the axis of the thermostatic actuator, between a first position in which the skirt seals the main outlet, such that the fluid flows between the inlet opening and the bypass outlet, a second position in which the skirt leaves the main outlet open and seals the bypass outlet, such that the fluid from the inlet opening can pass through the at least one aperture and flow through the main outlet, and a third over-stroke position in which a portion of the skirt is positioned in an over-stroke area of the hollow body and in which the skirt leaves the main outlet open and seals the bypass outlet.

2. The thermostatic valve according to claim 1, wherein the skirt comprises a substantially circular bottom wall and a cylindrical lateral wall in which the at least one aperture is formed, the bottom wall being adapted to seal the main outlet and the lateral wall being adapted to seal the bypass outlet.

3. The thermostatic valve according to claim 2, wherein the hollow body comprises at least one annular rib positioned at a mouth of the bypass outlet, so as to ensure static tightness with the lateral wall of the skirt when the skirt is in the second position.

4. The thermostatic valve according to claim 1, wherein a mouth of the main outlet has a conical wall.

5. The thermostatic valve according to claim 4, wherein the bottom wall of the skirt has a chamfer adapted to bear against the conical wall.

6. The thermostatic valve according to claim 2, wherein the lateral wall of the skirt has two diametrically opposite apertures.

7. The thermostatic valve according to claim 2, wherein a portion of the thermostatic actuator crosses the bottom wall of the skirt.

8. The thermostatic valve according to claim 1, wherein the hollow body comprises a warm-up outlet, the warm-up outlet being adapted to be sealed by the skirt in the second position.

9. The thermostatic valve according to claim 8, wherein the warm-up outlet and the bypass outlet are positioned in the hollow body at distinct axial locations.

10. The thermostatic valve according to claim 1, wherein the hollow body comprises an air-heater outlet, the air-heater outlet being adapted to be sealed by the skirt in the second position.

11. The thermostatic valve according to claim 10, wherein the air-heater outlet and the bypass outlet are positioned in the hollow body at distinct axial locations.

12. The thermostatic valve according to claim 10, wherein the hollow body comprises a warm-up outlet, the warm-up outlet being adapted to be sealed by the skirt in the second position and the air-heater outlet is positioned according to an axis distinct from a longitudinal axis of the warm-up outlet, such that the skirt separately seals or leaves open the air-heater outlet and the warm-up outlet.

13. The thermostatic valve according to claim 3, wherein a mouth of the main outlet has a conical wall.

14. The thermostatic valve according to claim 13, wherein the bottom wall of the skirt has a chamfer adapted to bear against the conical wall.

15. The thermostatic valve according to claim 14, wherein the lateral wall of the skirt has two diametrically opposite apertures.

16. The thermostatic valve according to claim 15, wherein a portion of the thermostatic actuator crosses the bottom wall of the skirt.

17. The thermostatic valve according to claim 16, wherein the hollow body comprises a warm-up outlet, the warm-up outlet being adapted to be sealed by the skirt in the second position.

18. The thermostatic valve according to claim 17, wherein the warm-up outlet and the bypass outlet are positioned in the hollow body at distinct axial locations.

19. The thermostatic valve according to claim 18, wherein the hollow body comprises an air-heater outlet, the air-heater outlet being adapted to be sealed by the skirt in the second position.

20. The thermostatic valve according to claim 19, wherein the air-heater outlet and the bypass outlet are positioned in the hollow body at distinct axial locations.

* * * * *